Aug. 23, 1966 R. W. BRADMILLER ETAL 3,268,834
OSCILLATOR WITH NEGATIVE FEEDBACK LOOP
Filed June 10, 1964
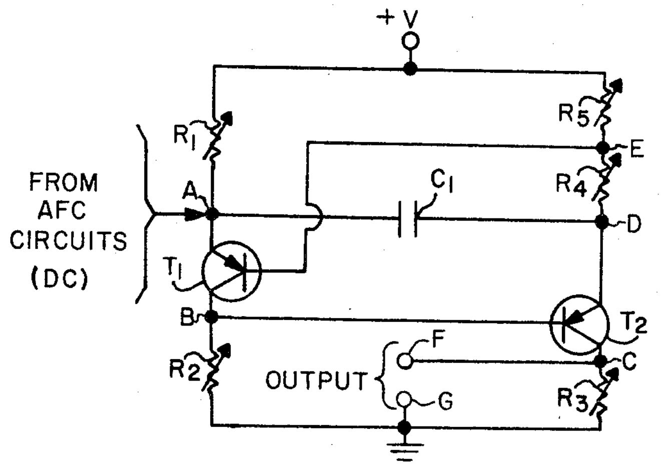
FIG I
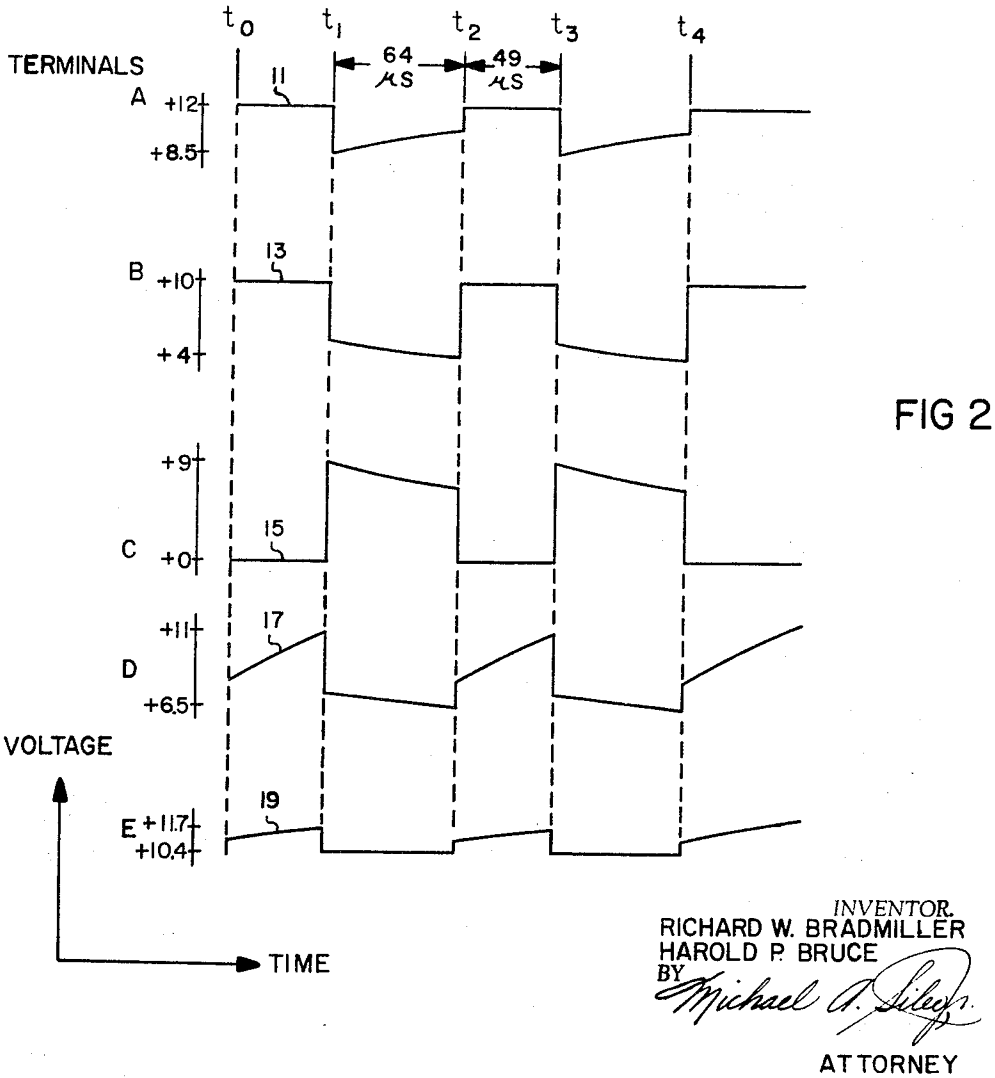
FIG 2
INVENTOR.
RICHARD W. BRADMILLER
HAROLD P. BRUCE
BY Michael A. Sileo Jr.
ATTORNEY United States Patent Office 3,268,834
Patented August 23, 1966

3,268,834

OSCILLATOR WITH NEGATIVE FEEDBACK LOOP

Richard W. Bradmiller and Harold P. Bruce, Orange County, Fla., assignors to Martin-Marietta Corporation, Middle River, Md., a corporation of Maryland Filed June 10, 1964, Ser. No. 374,020
9 Claims. (Cl. 331—113)

This invention relates to frequency stable oscillators, and more particularly to a transistorized, frequency stable, free running rectangular waveform generator advantageously capable of producing a highly stable frequency and which uniquely includes a capability of automatically changing the frequency of the generator by remotely applied D.C. control voltages so as to compensate for any undesirable frequency drifts due to any voltage or temperature variations.

In many communication and command intelligence systems, low frequencies are utilized, and to this extent highly reliable and stable low frequency generating equipment are required. Generally, such low frequency systems utilize low frequency generators at the receiving portion of the system and usually provide an automatic frequency control circuit for establishing the frequency of these generators. Automatic frequency control of the systems frequency generators is a highly desirable and often times an essential feature for providing rapid synchronization of the generator's frequency with respect to the frequency of the incoming signals thereby advantageously providing a capability for simultaneous or synchronous detection.

In more recently developed random access discrete address communication systems, such as the type described in patent application Serial No. 107,194, filed May 2, 1961, in the name of McKay Goode, which is assigned to the assignee of the instant application, there exists a requirement for a subcarrier or clock sampling frequency in the neighborhood of 10 kc. The subcarrier or clock frequency generator of these systems must be highly stable in order to achieve accurate demodulation of the incoming position modulated pulses. In this respect, it has been a common practice in some of these systems to utilize narrow band networks, such as crystal controlled, tuned L-C or tuned R-C type circuits to generate a relatively stable clock frequency.

In crystal controlled circuits, it is possible, with critically designed circuitry, of course, to achieve stabilities of approximately 50 parts per million per degree centigrade (p.p.m./° C.), whereas in tuned L-C or tuned R-C circuits, stabilities of approximately 1000 p.p.m./° C. are attainable. In all of these prior known narrow band networks, it is most difficult, and in most circumstances highly impractical, to include a capability of automatically changing the frequency of the network by remotely applied control voltages (AFC). In addition, when such networks are used for sampling purposes it is necessary to include shaping amplifiers for converting the simple waveforms (e.g. sine waves) generated by the networks into complex waveforms (e.g. square waves) which are used to perform certain triggering and switching functions inherently required in the demodulating section of today's random access discrete address communication systems. An example of one recently patented narrow band oscillator having a reasonably stable frequency output is set forth in U.S. Letters Patent No. 3,070,757, issued December 25, 1962, in the name of A. E. Plogstedt and R. W. Bradmiller, the latter patentee being a co-inventor of the present invention.

The prior art also teaches the use of specially designed multivibrators which may be either collector or emitter coupled and which can indeed be voltage controlled for changing the frequency of the multivibrators. However, such prior known multivibrators are not capable of developing a frequency having a variation of ±1% or better. Such frequency stability is mandatory when the generator is to be used in a random access discrete address communication system.

Electronic designers are well aware of the inherent deficiencies of prior known voltage controlled multivibrators. For example, when both a frequency stability of less than 10 p.p.m./° C., and a capability of handling relatively high speed commands are mutually required, such as the case in synchronous demodulation of position modulated pulses of audio communication systems, multivibrators have been found unacceptable because of their well known quiscent instability.

The foregoing deficiencies of prior art narrow band networks and voltage controlled multivibrators, are uniquely eliminated by the novel transistorized, frequency stable, free running rectangular wave generator of the present invention.

In accordance with the present invention a Z stage, transistorized generator is utilized to generate a stabilized low frequency squarewave. This novel squarewave generator develops a relatively stable frequency with circuit means considerably less complex than that required in prior known multi-stage sine wave generators and shapers. Briefly, this novel generator comprises in effect two alternatively conducting active devices, cross-connected so as to provide both a D.C. forward loop and a D.C. degenerative feedback loop. In addition an A.C. regenerative feedback loop is provided which includes a single reactive timing element, such as an exponential capacitor, for discharging the emitting elements of the active devices, and for restoring such emitting elements to their active bias region, thereby alternating or switching the conductive states of such active devices in a desired repetitious manner. That is to say, the D.C. forward loop, in conjunction with the D.C. regenerative feedback loop, prevents the active devices from simultaneously being in their high conductive states, or permit only one of such devices to be in its high conductive state during any finite interval of time; whereas, the reactive timing element in the A.C. regenerative feedback loop restores the emitting elements of the active devices to their active bias region. At this instant of time during the operation of the generator, the A.C. regenerative feedback loop drives the low conducting active device into high conduction, and in effect momentarily overrides the circuit function of the D.C. forward loop and the D.C. regenerative feedback loop. Thus, the current conducting states of the two active devices are alternated or reversed, or, as is commonly stated in the art, the generator "switches." As soon as this "switching" occurs, the D.C. forward loop and D.C. regenerative feedback loop again hold the active devices in their respective conducting states until such time as the reactive element once again drives and restores the emitting elements of the active devices to their active bias region, thereby causing the generator to once again "switch." In this novel squarewave generating circuit, it is the reactive element which primarily determines the repetition rate or frequency of the generator.

In addition to the foregoing advantageous features, the low frequency generator of the present invention desirably permits the use of D.C. control voltages in an AFC configuration, thereby automatically adjusting the generator's frequency and dynamically compensating for any undesirable frequency drifts of the generator's frequency commonly caused, for example, by voltage and/or temperature variations. This novel generator also has a relatively wide frequency control range and consequently is not significantly rate limited in response to external D.C. synchronizing information, and because of these features and advantages, it is well suited for use in the aforementioned communication system of McKay Goode, or in similar type communication systems.

It is accordingly a primary object of the present invention to provide a transistorized, frequency stable, free running rectangular waveform generator.

Another object of the present invention is to provide a waveform generator of the type described which further includes a capability of automatically changing the frequency of the generator by remotely applied D.C. control voltages.

Another object of the present invention is to provide a waveform generator of the type described which is advantageously capable of developing a highly stable clock sampling frequency for use as the clock generator in a random access discrete address communicaton system.

Another object of the present invention is to provide a squarewave generator of the type described which utilizes both a D.C. forward loop and a D.C. degenerative feedback loop in circuit combination with an A.C. regenerative feedback loop having a single reactive timing element, whereby a D.C. control voltage in an AFC configuration can be advantageously utilized to dynamically compensate for undesirable frequency drifts caused, for example, by voltage and/or temperature variations.

Another object of the present invention is to provide a squarewave generator of the type described which has a relatively wide frequency control range and is not significantly rate limited in response to D.C. synchronizing information.

These and further objects and advantages of the present invention will become more apparent upon reference to the following and claims and the appended drawings wherein:

FIGURE 1 is a circuit diagram of a preferred embodiment of the squarewave generator in accordance with the present invention, with the D.C. automatic frequency control (AFC) voltages developed by conventional AFC circuits (not shown) being applied to terminal A, and the output being developed across resistor $R_3$.

FIGURE 2 depicts waveforms present at several appropriate terminals in the circuit of FIG. 1, with the vertical dashed lines, which represent pertinent time periods, included to assist in the detailed explanation of the circuit of FIG. 1 and its mode of operation.

Referring specifically to FIG. 1, a preferred embodiment of the frequency stable oscillator is shown as comprising two transistors $T_1$ and $T_2$, each having emitter, collector and base electrodes. Transistor $T_1$ has its emitter connected to source +V via terminal A and variable resistor $R_1$, while its collector is connected to ground via terminal B and variable resistor $R_2$; whereas, transistor $T_2$ has its collector connected to ground via terminal C and variable resistor $R_3$, while its emitter is connected to source +V via terminal D, variable resistor $R_4$ terminal E, and variable resistor $R_5$. Note here, that the value of resistors $R_1$ and $R_2$ in the emitter-collector circuit of transistor $T_1$ and the value of resistors $R_3$–$R_5$ in the emitter-collector circuit of transistor $T_2$, and the cross-connection of the bases of transistors $T_1$ and $T_2$ to the resistive bias strings in the emitter circuits of transistors $T_2$ and $T_1$, respectively, determines the stabilized operating bias for transistors $T_1$ and $T_2$.

Base bias for transistor $T_1$ is provided by means of a direct connection between terminal E and the base of transistor $T_1$, whereas base bias for transistor $T_2$ is provided by means of a direct connection between terminal B and the base of transistor $T_2$. As will therefore be seen, an oscillator is formed wherein the repetition rate or frequency thereof is provided by the capacitor $C_1$, which is directly connected between terminals A and D. The rectangular waveform generated by the frequency stable oscillator is derived across resistor $R_3$, which is connected between terminal C and ground, and such output appears between terminal F and G.

In order to set up the oscillator of FIG. 1 for stable low frequency oscillation, the capacitor $C_1$ is effectively disconnected from circuit and the variable resistors $R_1$ to $R_5$ are adjusted for stable direct current operation. The emitter resistor $R_5$, in parallel with the series combination of resistors $R_4$ and the reflected emitter impedance of transistor $T_2$ with respect to source +V, constitutes a base driving impedance for transistor $T_1$. Accordingly, by maintaining the base driving impedance low in comparison to the base input impedance of transistor $T_1$, stable direct current operation results over a wide variation in transistor parameters.

When capacitor $C_1$ is effectively connected back into the circuit, the cross-coupled transistorized circuit of FIG. 1 goes into oscillation at a frequency directly determined by the values of variable resistors $R_1$ to $R_5$ and by the value of capacitor $C_1$, thereby deriving a stable low frequency output.

It should be noted at this point that the direct connection between terminal B and the base of transistor $T_2$ constitutes a forward loop; that the direct connection between terminal E to the base of transistor $T_1$ constitutes a degenerative or negative feedback loop; and that the capacitor $C_1$ connected between terminals A and D, which in effect is a reactive coupling between the emitters of transistors $T_1$ and $T_2$, constitutes a regenerative or positive feedback loop.

The forward loop, which comprises terminal B, base-collector path of transistor $T_2$, terminal C, resistor $R_3$, ground and resistor $R_2$, provides the base bias for transistor $T_2$. The negative feedback loop, which comprises terminal B, base-emitter path of transistor $T_2$, terminal D, resistor $R_4$, terminal E, and the base-collector path of transistor $T_1$, provides the base bias for transistor $T_1$ and insures that the oscillator of FIG. 1 will be free running. In addition, the negative feedback loop insures that the forward gain of the oscillator is equal to $$\frac{R_5+R_4}{R_5}$$

and that such oscillator is relatively independent of transistor parameters. The positive feedback loop, which comprises terminal A, emitter-collector path of transistor $T_1$, terminal B, base-emitter path of transistor $T_2$, terminal D and capacitor $C_1$, insures that the oscillator of FIG. 1 will oscillate, i.e., transistors $T_1$ and $T_2$ alternatively switch from their high to their low conductivity states. This is so because the overall gain of the oscillator is equal to or greater than one for all frequencies where $X_c$, which is the impedance of capacitor $C_1$, is equal to or greater than the impedance of the emitter of transistor $T_1$. This actually determines the repetition rate of the oscillator. Note here that the charge and discharge paths for capacitor $C_1$ during the time intervals $t_1$–$t_2$, $t_2$–$t_3$, $t_3$–$t_4$, etc. as shown in FIG. 2, involve all of the resistors $R_1$–$R_5$, as well as the saturated current gain and leakage of both transistors $T_1$ and $T_2$.

Note at this point that a D.C. control voltage is coupled to terminal A. That is to say, the novel oscillator described herein, unlike prior known stable oscillators, is uniquely capable of being frequency controlled by a D.C. control voltage conventionally developed by well known AFC circuits. Thus, by comparing the A.C. component of the squarewave appearing across terminals F and G with a standard A.C. voltage, a D.C. error voltage can be developed via well known AFC circuitry. This D.C. error voltage when applied to the oscillator via terminal A, for example, advantageously and rapidly compensates for any frequency shifts of the output squarewave from a desired and predetermined frequency.

Accordingly, when the D.C. error or control voltage is applied on terminal A, a new operating frequency is automatically established. What is most important at this point is the fact that this new operating frequency is established without destroying the aforementioned stabilized characteristics, thus achieving desirable long term stability for internal variations of temperature and component tolerances while yet still exhibiting a capability of rapid control of the oscillator's frequency by automatic externally developed D.C. control voltages. Note here that the capacitor $C_1$, which is connected in a regenerative feedback loop arrangement, does not adversely affect the response time of the oscillator, as is the case in oscillators utilizing narrow band selective networks. This desirable response time characteristic of the oscillator of the present invention is possible because of the wide band width characteristics of the reactive network of the regenerative feedback loop.

Although the resistors $R_1$ through $R_5$ are shown as variable resistors for purposes of explaining the balanced operation of the oscillator of the present invention, fixed resistors are normally utilized, and the interdependence thereof must be established to provide this balanced operation as will be discussed in detail below. The operation of the oscillator of FIG. 1 in light of the waveforms of FIG. 2 follows.

At time $t_0$, let it be assumed that the voltages at terminals A–E are shown in waveforms 11 to 19, respectively, of FIG. 2. Note that during time interval $t_0$–$t_1$ the voltage of waveforms 17 and 19 are slowly increasing.

During time interval $t_0$–$t_1$, the capacitor $C_1$ in the regenerative feedback loop between the terminals A and D commences to charge thereby slowly allowing the voltage on terminal D to increase as shown in waveform 17. When voltage on terminal D exceeds the voltage on terminal B, which is in effect the bias voltage for the base of transistor $T_2$, a "switching" action takes place. That is to say, transistor $T_2$ is rapidly driven into a heavy conducting state which rapidly causes the voltages at both terminals D and B to fall. This rapid decrease of the voltages of waveforms 17 and 11 occur at time $t_1$. Note here that the voltages at terminals A and E, i.e., waveforms 11 and 19, also rapidly decrease, when waveform 17 exceeds waveform 13, whereas, the voltage at terminal C, i.e., waveform 15, rapidly increases at the occurance of this event. This is due to the "switching" of transistor $T_2$ from a low conductive state to a high conductive state.

At time $t_1$, when the voltage on terminal D, i.e., emitter of transistor $T_2$, exceeds the voltage on terminal B, i.e., base of transistor $T_2$, transistor $T_2$ is driven rapidly into heavy conduction, and the voltages at terminals D and B rapidly fall or in effect such voltage terminals follow the voltage change on terminal A, which is the emitter of transistor $T_1$. Note here that the voltage at terminal B, which follows the voltage at terminal A causes the transistor $T_2$ to conduct heavily, thereby driving the voltage at terminal D to even a greater negative value. Due to the capacitor action of $C_1$, transistor $T_1$ is driven into a low conductivity state. Although transistor $T_1$ experiences a reduced current conduction, the voltage on terminal A is being driven through the capacitor $C_1$ and follows the voltage change on terminal D.

Let us assume now that time $t_1$ represents the beginning of a complete cycle of operation of the novel oscillator of the present invention. During the time interval $t_1$–$t_2$, due to the degenerative feedback loop between terminals E and the base of transistor $E_1$, the voltage at terminal A rises slowly to a voltage level exceeding the voltage level at terminal E (note waveforms 11 and 19), which in effect exceeds the bias established at the base of transistor $T_1$. When the voltage at terminal A, i.e., emitter of transistor $T_1$, exceeds the voltage level at terminal E, i.e., base of transistor $T_1$, a "switching" action again occurs, and the transistor $T_1$ is now rapidly driven into its high conductivity state. Note that the voltage on terminal A is again driven through the capacitor $C_1$ and caused to follow the voltage change on terminal D. When the "switching" action occurs, transistor $T_2$ is rapidly driven into its low conductivity state, which in turn rapidly causes the voltage at terminals D to rise, toward V+ and the voltage at C to fall toward ground. Note that the change in voltage at terminal D, through capacitor action of $C_1$, drives terminal A and that terminal B, because it is in the emitter-collector circuit path of transistor $T_1$, follows the voltage change on terminal A. This rapid increase of voltages of waveforms 17 and 11 occur at time $t_2$. Note also, that the voltages at terminals A and E also rapidly rise. This is due to the "switching" of transistor $T_2$ from its high conductivity state.

At time $t_2$, when the voltage on terminal A, i.e., emitter of transistor $T_1$, exceeds the voltage on terminal E, i.e., base of transistor $T_1$, transistor $T_1$ is driven rapidly into its high conductivity state, and the transistor $T_2$ is driven rapidly into its low conductivity state. Thus, the voltages at terminals D, E, A and B rapidly rise, as shown in FIG. 2 at this time period.

Let us now assume that time $t_2$ represents the end of the first half cycle of operation of the novel oscillator of FIG. 1.

During the time interval $t_2$–$t_3$, the slow changing circuit conditions above described with regard to time interval $t_0$–$t_1$ are repeated. Thus, at time $t_3$, the oscillator again "switches" as explained above regarding the "switching" action occurring at time $t_1$.

Let us now assume that time $t_3$ represents the end of the full cycle of operation. Thus, the waveforms 11–19 during time interval $t_1$–$t_3$ represents one complete cycle of operation of the oscillator of FIG. 1. Note here that the voltages present on terminals A–E during each of the times $t_1$, $t_2$ and $t_3$ reverse polarity in a considerably small interval of time which for purposes of this discussion may be considered substantially simultaneous.

The waveform at terminal C, or output terminals F and G, is a squarewave having rapid rise and fall times. Of course, output waveform 15 may be coupled to a positive and negative clamp for providing any desired voltage peaks.

Note at this point that the "switching" feature of the oscillator of the present invention, which is due to the novel cross coupling arrangement of transistors $T_1$ and $T_2$, provides a repetitious squarewave, and that such oscillator is free running. Note further, that the charge and discharge path for capacitor $C_1$ during each half-cycle involves each of the resistors $R_1$–$R_5$, as well as the saturated current gain of each of the transistors $T_1$ and $T_2$.

It has been established through extensive experimentation that the frequency stability of the oscillator of FIG. 1 is considerably high. For exemplary purposes the below chart shows "on-time" variations of the transistors $T_1$ and $T_2$ when any one of the resistors $R_1$–$R_5$ experiences a 10% decrease in value.

| Element | On Time (Percent Change) | |
|---|---|---|
| R | $T_1$ | $T_2$ |
| | *Percent* | *Percent* |
| $R_1$ | −3 | 0 |
| $R_2$ | +3 | −7 |
| $R_3$ | +5 | −14 |
| $R_4$ | −1 | −9 |
| $R_5$ | +12 | 0 |
| Totals | +16 | −30 |

As can be seen from the above chart for a given active device, the oscillator of the present invention uniquely provides a capability of balancing or compensating for voltage and temperature variations so as to advantageously provide several orders of magnitude improvement in frequency stability. The circuit of FIG. 1 provides frequency stability improvement from 5000 p.p.m./° C. to better than 200 p.p.m./° C. It has also been established that stabilities of 2 p.p.m./° C. can be readily achieved by incorporating a 3.2K resistor and a 1.5K sensitor for resistor $R_2$.

For exemplary purposes only the following values for the components of the circuit of FIG. 1 are included as follows:

| | |
|---|---|
| $T_1$ and $T_2$ | 2N1499A. |
| $C_1$ | .068 microfarad. |
| $R_1$ | 820 ohms. |
| $R_2$ | 4.7 kilohms. |
| $R_3$ | 680 ohms. |
| $R_4$ | 470 ohms. |
| $R_5$ | 220 ohms. |
| +V source | 12 volts D.C. |

The terms and expressions which have been employed herein are used as terms of description and not of limitation and it is not intended, in the use of such terms and expressions, to exclude any equivalents of the features shown and described, or portions thereof, but it is recognized that various modifications are possible within the scope of the present invention.

Without further elaboration, the foregoing is considered to explain the character of the present invention so that others may, by applying current knowledge, readily adapt the same for use under varying conditions of service while still retaining certain features which may properly be said to constitute the essential items of novelty involved, which items are intended to be defined and secured by the appended claims.

We claim:

1. An oscillator for generating a stable, low frequency, substantially rectangular wave comprising, in combination:
   (a) first and second active means, each including electron emitting, collecting and control means;
   (b) means for coupling the collecting means of said first active means to the control means of said second active means in a forward loop manner;
   (c) means for coupling the emitting means of said second active means to the control means of said first active means in a degenerative manner; and
   (d) reactive means for coupling together said emitting means of said first and second active means in a regenerative manner, whereby said reactive means establishes the repetition rate of said oscillator.

2. An oscillator in accordance with claim 1, wherein:
   (a) an external control voltage is coupled to said oscillator for automatically adjusting the repetition rate of said oscillator.

3. An oscillator in accordance with claim 2, wherein:
   (a) said active means are solid state devices having emitter collector and control electrodes; and
   (b) said reactive means is a capacitor.

4. A free running oscillator for generating a stable, low frequency, substantially rectangular wave comprising, in combination:
   (a) first and second active means, each including electron emitting, collecting and control means;
   (b) a source of potential;
   (c) resistive means for respectively coupling the collecting means of each of said active means to ground;
   (d) resistive means for respectively coupling the emitting means of each of said means to said source of potential;
   (e) D.C. means for coupling the collecting means of said first active means to the control means of said second active means in a forward loop circuit arrangement;
   (f) D.C. means for coupling the emitting means of said second active means to the control means of said first active means in a degenerative circuit arrangement; and
   (g) reactive means for coupling together said emitting means of said first and second active means in a regenerative circuit arrangement, whereby said reactive means establishes the frequency of said oscillator.

5. An oscillator in accordance with claim 4, wherein:
   (a) said active means are solid state devices having emitter, collector and control electrodes;
   (b) said resistive means are resistors; and
   (c) said reactive means is a capacitor.

6. An oscillator in accordance with claim 5, wherein:
   (a) an external D.C. control voltage is coupled to said first solid state device for automatically adjusting the frequency of said oscillator.

7. A free running oscillator for generating a stable, low frequency, substantially square wave comprising, in combination:
   (a) first and second active devices, each including current emitting, current collecting and current control means;
   (b) a D.C. source of potential;
   (c) said collecting means of each of said active devices being connected to ground through respective first and second resistive means;
   (d) said emitting means of said first active device being connected to said source through a third resistive means;
   (e) said emitting means of said second active device being connected to said source through a fourth and fifth series connected resistive means;
   (f) said control means of said first active device being connected to the junction of said fourth and fifth resistive means so as to provide a degenerative feedback loop;
   (g) said control means of said second active device being connected to said collecting means of said first active device so as to provide a forward loop; and
   (h) reactive means coupled between said emitting means of said first and second active devices so as to provide a regenerative feedback loop, whereby said reactive means establishes the frequency of said oscillator.

8. An oscillator in accordance with claim 7, wherein:
   (a) said active devices are transistors having emitter, collector and control electrodes;
   (b) said resistive means are resistors; and
   (c) said reactive means is a capacitor.

9. An oscillator in accordance with claim 8, wherein:
   (a) an external D.C. control voltage is coupled to said emitter electrode of said first transistor for automatically adjusting the frequency of said oscillator.

No references cited.

ROY LAKE, *Primary Examiner.*

J. KOMINSKI, *Assistant Examiner.*